(12) United States Patent
Campbell et al.

(10) Patent No.: US 11,671,484 B2
(45) Date of Patent: Jun. 6, 2023

(54) METHODS AND SYSTEMS FOR ORCHESTRATING A DISTRIBUTED COMPUTING SERVICE BASED ON LATENCY PERFORMANCE LEVELS

(71) Applicant: Verizon Patent and Licensing Inc., Basking Ridge, NJ (US)

(72) Inventors: Kirk Campbell, Long Valley, NJ (US); John Patrick Hickey, III, Metuchen, NJ (US); Anil K Guntupalli, Irving, TX (US); Art Zaifman, Millburn, NJ (US); Jayashree Srinivasan Kilkovalavedu, Monmouth Junction, NJ (US); Raghuram Parvataneni, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 17/032,727

(22) Filed: Sep. 25, 2020

(65) Prior Publication Data
US 2022/0103617 A1    Mar. 31, 2022

(51) Int. Cl.
*H04L 67/101* (2022.01)
*H04L 67/1008* (2022.01)
*H04L 67/52* (2022.01)

(52) U.S. Cl.
CPC ........ *H04L 67/101* (2013.01); *H04L 67/1008* (2013.01); *H04L 67/52* (2022.05)

(58) Field of Classification Search
CPC ... H04L 67/101; H04L 67/1008; H04L 67/18; H04L 67/52
See application file for complete search history.

(56) References Cited

U.S. PATENT DOCUMENTS

| | | | |
|---|---|---|---|
| 10,880,232 B1* | 12/2020 | Goodman | H04L 47/76 |
| 10,979,534 B1* | 4/2021 | Parulkar | G06F 9/5072 |
| 11,228,516 B1* | 1/2022 | Harwani | H04L 43/0876 |
| 2009/0154367 A1* | 6/2009 | Aaron | H04W 64/006 |
| | | | 370/252 |
| 2012/0131129 A1* | 5/2012 | Agarwal | H04L 43/0852 |
| | | | 709/216 |
| 2013/0198388 A1* | 8/2013 | Dahn | H04L 67/1021 |
| | | | 709/226 |

(Continued)

*Primary Examiner* — Kevin T Bates
*Assistant Examiner* — Ranjan Pant

(57) ABSTRACT

An illustrative latency service system identifies, in response to a request by a user equipment (UE) device for performance of a distributed computing service, a latency performance level to which the UE device is subscribed. The system obtains real-time latency performance data for a distributed computing network that is to perform the distributed computing service for the UE device in response to the request, and, based on the real-time latency performance data, determines a characteristic of a geographic zone in which the UE device is located. The characteristic is associated with latency performance that the distributed computing network is capable of providing in the geographic zone. Based on the latency performance level and the characteristic of the geographic zone, the system arranges for the performance of the distributed computing service for the UE device by the distributed computing network. Corresponding methods and systems are also disclosed.

20 Claims, 10 Drawing Sheets

(56) References Cited

U.S. PATENT DOCUMENTS

| | | | |
|---|---|---|---|
| 2014/0229614 A1* | 8/2014 | Aggarwal | H04M 3/2236 |
| | | | 709/224 |
| 2016/0248650 A1* | 8/2016 | Galime | H04L 43/087 |
| 2016/0255205 A1* | 9/2016 | Russell | H04W 64/00 |
| | | | 455/406 |
| 2019/0140919 A1* | 5/2019 | Smith | H04L 41/5019 |
| 2019/0340168 A1* | 11/2019 | Raman | G06F 16/258 |
| 2019/0364492 A1* | 11/2019 | Azizi | H04W 48/16 |
| 2020/0059825 A1* | 2/2020 | Xu | H04W 48/06 |
| 2020/0322836 A1* | 10/2020 | Lekutai | H04L 67/1036 |
| 2021/0112136 A1* | 4/2021 | Seo | H04L 67/2842 |
| 2021/0144517 A1* | 5/2021 | Guim Bernat | H04L 9/3213 |
| 2022/0113790 A1* | 4/2022 | Doshi | H04L 41/5009 |

\* cited by examiner

METHODS AND SYSTEMS FOR ORCHESTRATING A DISTRIBUTED COMPUTING SERVICE BASED ON LATENCY PERFORMANCE LEVELS

BACKGROUND INFORMATION

Modern computing commonly employs distributed computing architectures in which processing required by individual user equipment (UE) devices (e.g., mobile devices such as smartphones and tablet devices, Internet of Things (IoT) devices, consumer and business personal computers, etc.) is not performed exclusively by local computing resources of the UE devices themselves, but, rather, is at least partially performed by computing resources located elsewhere. Distributed computing networks configured to provide distributed computing services to UE devices in this way may increase the efficiency of processing that is performed because, among other reasons, powerful computing resources can be concentrated and managed at a single site shared by many UE devices (e.g., as opposed to being replicated in each UE device). One challenge that distributed computing networks must address is the orchestration of which distributed computing resources are to provide which distributed computing services for which UE devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
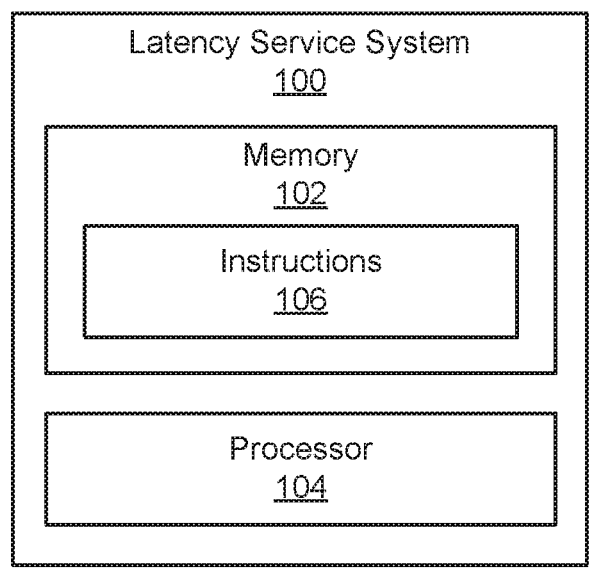
FIG. 1 shows an illustrative latency service system for orchestrating a distributed computing service based on latency performance levels according to embodiments described herein.

Methods and systems for orchestrating a distributed computing service based on latency performance levels are described herein. A distributed computing network may include various compute nodes (e.g., multi-access servers such as multi-access edge computing (MEC) servers, cloud servers, etc.) capable of performing distributed computing services requested by user equipment (UE) devices served by the distributed computing network. As such, and as mentioned above, orchestrating which compute node is to perform which distributed computing service for which UE device may be one challenge that distributed computing networks need to address. Part of this challenge may involve trying to optimize the selection of which compute node is to be assigned to fulfill which service request, all while accounting for various factors such as transport and processing latencies, performance parameters associated with the service request, real-time performance capabilities and efficient use of distributed computing network resources, and so forth. Effective and efficient distributed computing networks described herein may take various approaches to such distributed computing service orchestration challenges. For example, when a set of compute nodes of a distributed computing network is accessible to a UE device requesting a distributed computing service, distributed computing service orchestration may refer to automatic and real-time algorithms, decision-making processes, operations, communications, etc., that relate to selecting which compute node is to be assigned to fulfill the service request (e.g., which compute node is to provide the requested service to the UE device).

One issue that arises for distributed computing service orchestration is a balance between providing distributed computing services that are low latency and yet also highly efficient in terms of resource usage. Latency performance provided by a distributed computing network to a UE device has been based on characteristics that are largely outside of the control of a user of the UE device. In some examples, a user may have been able to receive good latency performance (i.e., low latency and high responsiveness for distributed computing services provided to his or her UE device) when requesting distributed computing services at non-peak times and/or in non-congested areas. However, the latency performance experienced by the user during more typical circumstances (e.g., in highly-populated areas, during peak times when many people may be requesting distributed computing services, etc.) may be determined by various factors for which the user has little or no visibility, and that are impossible for the user to predict and/or control. Consequently, the user of conventional distributed computing service orchestration may feel that latency performance is unpredictable and merely a matter of chance or luck.

To address this perception and provide the user with a greater sense of predictability and control over the latency performance he or she will experience, latency service systems and methods described herein facilitate a distributed computing system that allows users to explicitly select and subscribe to different latency performance levels. For example, for a first user wishing to experience distributed-computing-based extended reality (e.g., virtual or augmented reality, etc.) during peak times and/or in locations near many other people also using distributed computing services, good latency performance may be considered highly valuable and/or necessary. For instance, a high level of latency performance may help the user to avoid a feeling of motion sickness that the user may otherwise feel during the extended reality experience if a lower level of latency performance is provided. In contrast, for a second user leveraging distributed computing services at around the same time and place as the first user, distributed computing services provided with lower levels of latency performance may be sufficient due to the nature of the applications with which the second user is engaging. Accordingly, the first user may be happy to consistently receive a high level of latency performance, while the second user may be happy to use his or her resources efficiently by choosing a lower latency performance level. For both of these types of users and others, intelligent and efficient distributed computing service orchestration may help ensure that the users enjoy a high-quality experience as their devices are provided with responsive, powerful, and efficient services from the distributed computing network.

Along with benefits of flexibility and choice provided to users of a system offering distributed computing services at different latency performance levels as described above, technical benefits also accrue to the distributed computing network, and these benefits also provide advantages to entities providing the services (e.g., distributed computing network providers such as mobile carriers, etc.). For example, by providing lower radio area network (RAN) latencies (e.g., latencies associated with communication between UE devices and network communication nodes such as NodeBs) and/or wireline latencies (e.g., latencies associated with communication between the network communication nodes and the compute nodes that perform the distributed computing services), a distributed computing network may reduce performance pressure on compute nodes. This may provide more time for these nodes to perform assigned services and tasks and widen the candidate list of eligible compute nodes capable of performing a given distributed computing service. Additionally or alternatively, this reduction of performance pressure may allow for more efficiency in developing and managing the distributed computing network, such as by allowing for a larger quantity of less costly computing resources to be deployed or the like. Moreover, intelligent and efficient distributed computing service orchestration may facilitate carriers in increasing the density of service deployment to provide high-quality services to a larger number of customers in efficient and scalable ways.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Latency service methods and systems described herein for orchestrating distributed computing services based on latency performance levels may provide any of the benefits mentioned above, as well as various additional and/or alternative benefits that will be described and/or made apparent below.

FIG. 1 shows an illustrative latency service system 100 for orchestrating a distributed computing service based on latency performance levels according to principles described herein. System 100 may be implemented by computer resources such as servers, processors, memory devices, storage devices, communication interfaces, and so forth. For example, system 100 may be included within or otherwise associated with one or more compute nodes or other computing systems (e.g., MEC servers, cloud servers, local servers, etc.) as may serve a particular implementation. As such, a computing system implementing system 100 may be configured to orchestrate distributed computing services, to perform distributed computing services, and/or otherwise to provide orchestration services to be provided to UE devices by a distributed computing network.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with orchestrating distributed computing services based on latency performance levels as described herein and/or as may serve a particular implementation.

Figure 2:
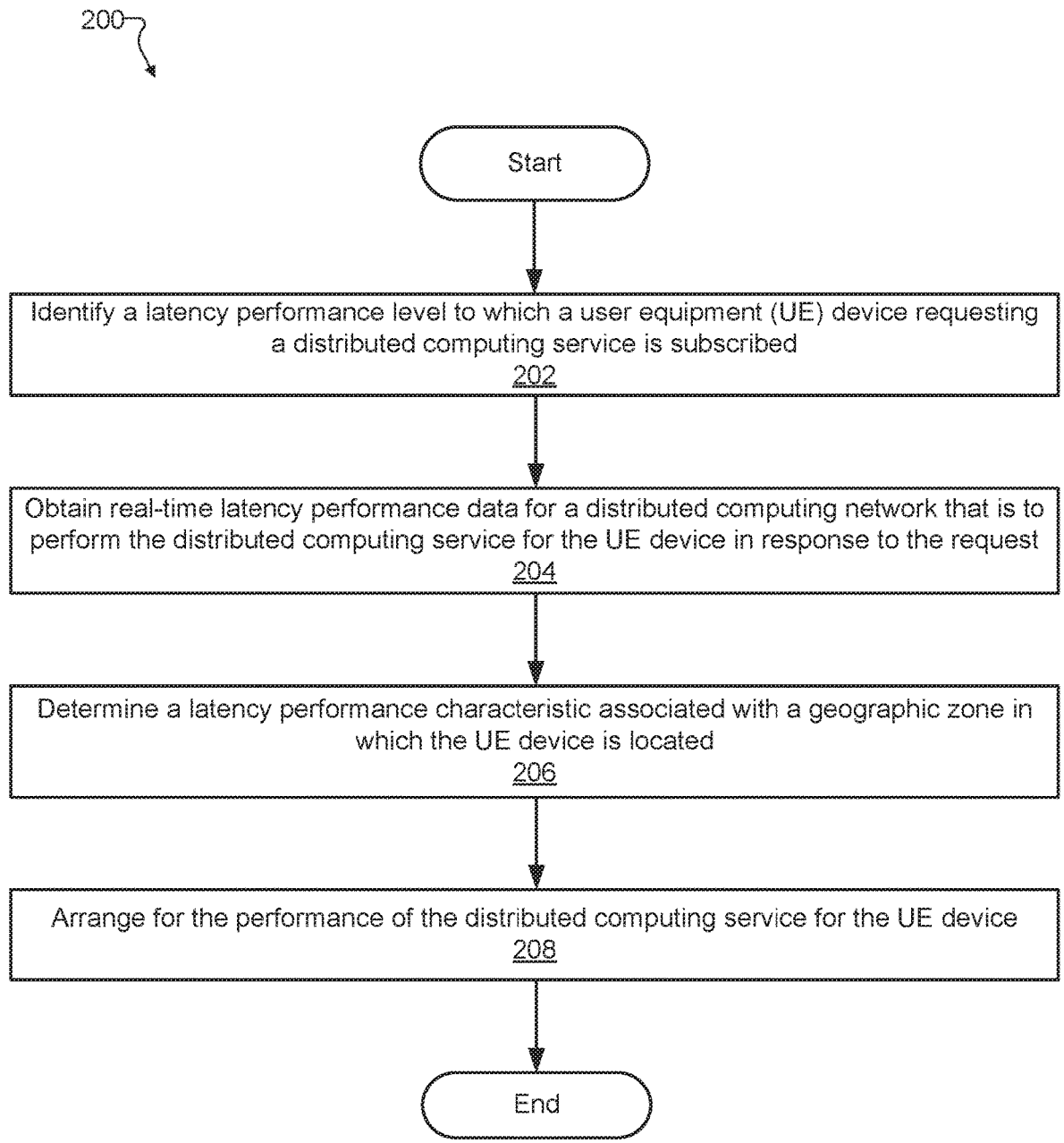
FIG. 2 shows an illustrative method for orchestrating a distributed computing service based on latency performance levels according to embodiments described herein.

As one example of functionality that processor 104 may perform, FIG. 2 shows an illustrative method 200 for orchestrating a distributed computing service based on latency performance levels in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a latency service system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of the operations of method 200 will now be described in more detail as the operations may be performed by system 100 (e.g., by processor 104 as processor 104 executes instructions 106 stored in memory 102).

At operation 202, system 100 may identify a latency performance level to which a UE device is subscribed. More particularly, the UE device may request performance of a distributed computing service, and, in response to this request, system 100 may determine that the UE device is subscribed to a particular latency performance level of a plurality of latency performance levels that are offered as part of a distributed computing service. As one example, system 100 may identify a first latency performance level (e.g., a "Gold" latency performance level) that is associated with a highest level of latency performance that is available. As another example, system 100 may identify another latency performance level (e.g., a "Silver," "Bronze," or other latency performance level) that is associated with a level of latency performance that is lower than the highest level but that may be considered more appropriate, efficient, cost-effective, or the like, for a user of the UE device. Various examples of different latency performance levels and their corresponding effects for a UE device requesting a distributed computing service will be described in more detail below.

At operation 204, system 100 may obtain real-time latency performance data for a distributed computing network that is to perform the distributed computing service for the UE device in response to the request. For example, the real-time latency performance data may indicate, for the present moment, that the distributed computing network is congested in one geographic zone (e.g., such that latency performance is expected to be compromised to a certain degree in that geographic zone), and that the distributed computing network is operating below capacity in another geographic zone (e.g., such that the latency performance in that geographic zone is more optimal). As another example, real-time latency performance data obtained for a given geographic zone at different times (e.g., different times of day; different times during a weekly, monthly, seasonal, or other cycle; etc.) may indicate that the distributed computing network is capable of providing one degree of latency performance at one point in time (e.g., during a peak time in the evening, etc.) and a different degree of latency performance at another point in time (e.g., in the middle of the night, etc.). Real-time latency performance data may be represented in any suitable form and may be obtained from any suitable data source that may capture or determine the real-time latency performance data in any suitable way, examples of which will be described in more detail below.

At operation 206, system 100 may determine a characteristic of a geographic zone in which the UE device is located. For example, the characteristic may be determined based on the real-time latency performance data obtained at operation 204 and may be associated with latency performance that the distributed computing network is capable of providing in the geographic zone. As will be described in more detail below, one example of such a characteristic may be a lower bound of latency performance (e.g., a minimum latency performance) that the distributed computing network can guarantee will be provided throughout the geographic zone in which the UE device is located (e.g., to the UE device and/or to other UE devices currently located in the geographic zone). As another example, the characteristic of the geographic zone determined at operation 206 may be an upper bound of latency performance (e.g., a maximum latency performance) that the available resources of the distributed computing network are capable of providing to the UE device and/or the other UE devices currently located throughout the geographic zone. Various examples of geographic zones, and the latency performance characteristics that may be determined therefor, will be described in more detail below.

At operation 208, system 100 may arrange for the performance of the distributed computing service for the UE device by the distributed computing network. For example, system 100 may complete the orchestration of the distributed computing service at operation 208 by selecting and assigning an efficient and capable compute node within the distributed computing network to perform the distributed computing service for the UE device. In certain examples, system 100 may arrange for the performance of the distributed computing service at operation 208 based on the latency performance level identified at operation 202 and/or the latency performance characteristic of the geographic zone determined at operation 206. The arrangement for the performance of the distributed computing service may be performed in any manner as described herein or as may serve a particular implementation.

Figure 3:
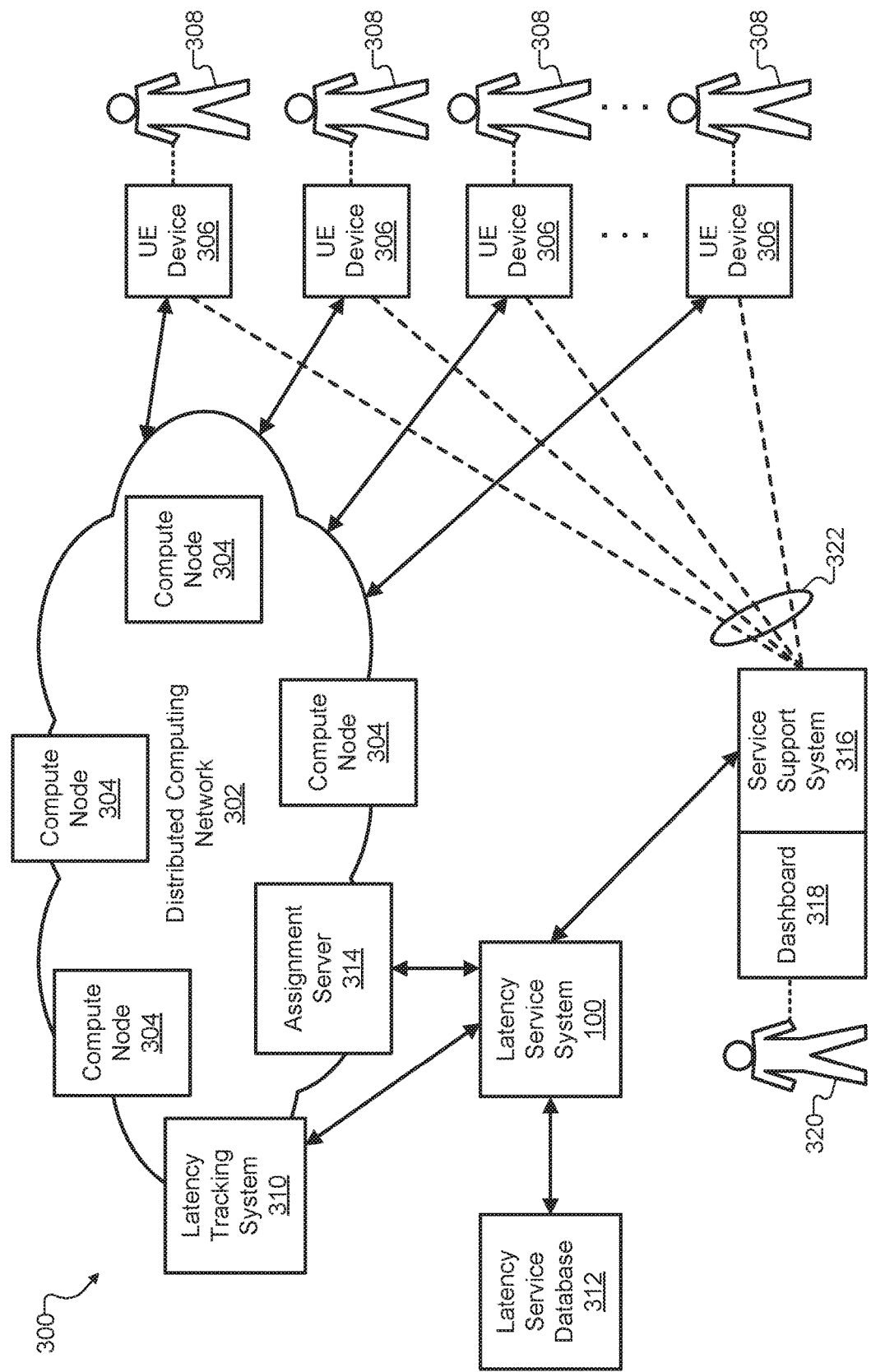
FIG. 3 shows an illustrative configuration in which the latency service system of FIG. 1 may operate to orchestrate distributed computing services based on latency performance levels according to embodiments described herein.

FIG. 3 shows an illustrative configuration 300 in which system 100 may operate to orchestrate distributed computing services based on latency performance levels in accordance with principles described herein. As shown, system 100 may orchestrate distributed computing services to facilitate a distributed computing network 302. Distributed computing network 302 is shown to include a plurality of compute nodes 304 that are each configured to perform distributed computing services for any of a plurality of UE devices 306 for the benefit and/or at the direction of respective users 308 of the UE devices. As such, system 100 may perform the distributed computing service orchestration in conjunction with a latency tracking system 310, a latency service database 312, an assignment server 314, and a service support system 316, each of which may be communicatively coupled to system 100 as shown in configuration 300. Additionally, as further shown, service support system 316 may provide a dashboard 318 to an operator 320 associated with providing the service, as well as network usage data 322 associated with service usage statistics for each of UE devices 306. Each of the components of configuration 300 will now be described in more detail.

Distributed computing network 302 may represent various networks and/or parts of networks used to provide communication and distributed computing services to UE devices 306. For example, distributed computing network 302 may include compute nodes 304 that are configured to perform distributed computing services (e.g., computing tasks, etc.) requested by UE devices 306, as well as network communication equipment enabling data communication between UE devices 306 and compute nodes 304. Distributed computing network 302 may implement or employ any suitable communication technologies, devices, media, protocols, or the like as may serve a particular implementation. In some examples, distributed computing network 302 may include a provider network and/or additional networks outside of the provider network (e.g., external networks associated with the Internet).

A provider network included within distributed computing network 302 may be implemented as a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control some or all of compute nodes 304, as well as various elements necessary to deliver communications and distributed computing services to users 308 of UE devices 306 (e.g., radio spectrum allocation, wireless network infrastructure, back haul infrastructure, customer care, provisioning of devices, etc.).

In various examples, a provider network included within distributed computing network 302 may include or consist of various network resources that may include or be associated with compute nodes 304 implemented as multi-access servers such as MEC servers. For instance, one or more radio access network (RAN) resources may directly communicate with UE devices 306 and may provide access to MEC servers integrated with the RAN resources, one or more transport access point (TAP) resources may communicate with UE devices 306 indirectly (e.g., by way of the RAN resources) and may provide access to additional integrated MEC servers, one or more service access point (SAP) resources may communicate with UE devices 306 indirectly (e.g., by way of the RAN and/or TAP resources) and may provide access to still other integrated MEC servers, and so forth. In all of these examples, MEC servers and/or other multi-access servers integrated within the network resources may implement some or all of the compute nodes 304 shown in configuration 300. Additionally, in some examples, other network resources may likewise assist in providing communication services for UE devices 306 and/or may provide access to MEC servers or other compute nodes 304 in any manner as may serve a particular implementation.

Along with a provider network such as has been described, distributed computing network 302 may further include or implement elements of one or more additional networks external to the provider network (e.g., third party networks associated with the Internet, etc.). Access to additional compute nodes 304 (e.g., cloud servers, etc.) beyond the MEC servers of the provider network may be provided by these additional networks. Certain additional network elements within distributed computing network 302 may be included within peer networks connected to the provider network by high bandwidth connections (e.g., direct fiber optic lines, etc.), such that certain compute nodes 304 may be operated on the peer networks. Other network elements of distributed computing network 302 may be associated with networks external to the provider network, such that other compute nodes 304 may be implemented by cloud servers operated by cloud computing enterprises.

Each compute node 304 may be implemented by a computing system (e.g., a server, a blade server, an edge server, a set of servers at a single site, etc.) that includes a respective set of computing resources, that is accessible to multiple UE devices 306 separate from the compute node 304, and that is configured to perform processing and data services for the UE devices 306. As mentioned above, compute nodes 304 implemented within a provider network of distributed computing network 302 (e.g., so as to be near the edge of distributed computing network 302 where UE devices 306 connect to the network) may be implemented as MEC servers, while other compute nodes 304 implemented further from the edge of the provider network (e.g., within external networks that are accessible to UE devices 306 by way of the provider network) may be implemented as cloud servers or other multi-access servers.

The communicative and geographical proximity of a compute node 304 to a UE device 306 that is requesting and receiving a distributed computing service may at least partially determine the performance (e.g., latency performance, etc.) that the compute node 304 is capable of providing. For instance, compute nodes 304 such as MEC servers that are located near UE devices 306 are generally capable of performing data services with a lower latency than compute nodes 304 such as cloud servers that are located farther away from UE devices 306. A particular compute node 304 may include a set of co-located computing resources (e.g., processors, CPUs, GPUs, memory, communication resources, etc.) such that the computing resources all communicate with a particular UE device 306 with a similar transport latency and such that the particular compute node 304 may be treated as a single, discrete entity for the purposes of orchestrating distributed computing services by system 100.

Each UE device 306 may be implemented as any computing device configured to connect to distributed computing network 302 and to request and/or receive distributed computing services (e.g., processing services, data services, storage services, etc.) from one or more compute nodes 304 by way of distributed computing network 302. As shown, certain UE devices 306 may be associated with one or more users 308. For example, a UE device 306 implemented as a personal computer (e.g., a desktop or laptop computer, etc.) or a mobile device (e.g., a smartphone or tablet device, etc.) may be owned and controlled by a user 308 of the UE device 306, as shown in configuration 300. It will be understood that other types of UE devices (e.g., certain IoT devices and embedded systems such as may be employed in smart appliances, specialized testing or automation equipment, etc.) may not be associated with one specific user 308. For example, such UE devices may be included among a plurality of UE devices controlled by a single user or may be shared and controlled by a large number of users.

Latency tracking system 310 may be configured to perform real-time latency performance tracking for distributed computing network 302. To this end, as shown in configuration 300, latency tracking system 310 may be integrated with distributed computing network 302 and communicatively coupled to system 100 to provide the real-time latency performance data for distributed computing network 302 to system 100 (e.g., as described above with respect to operation 204 of method 200). Latency tracking system 310 may capture, detect, determine, and/or otherwise track latency performance data for distributed computing network 302 in any manner as may serve a particular implementation. For example, in certain implementations, latency tracking system 310 may assign certain UE devices (e.g., special UE devices associated with operations of distributed computing network 302, ordinary UE devices such as UE devices 306 being used by subscribers such as users 308, etc.) to periodically perform latency performance tests and report back measured latency performance results to latency tracking system 310. As another example, latency tracking system 310 may access, from each compute node 304, latency performance data tracked by the compute nodes themselves as the compute nodes 304 provide distributed computing services for UE devices 306. In still other examples, latency tracking system 310 may determine, generate, and track the real-time latency performance data in other ways and may provide this data to system 100 in response to requests from system 100 or as a matter of course (e.g., providing the data without any explicit request).

In certain examples, latency tracking system 310 may be integrated together with system 100 in a single computing device or compute node (e.g., within a MEC server or other compute node 304 of distributed computing network 302). In other examples, latency tracking system 310 may be a distributed system and/or may be implemented separately from system 100 and communicatively coupled with system 100 by way of distributed computing network 302 or another suitable communicative connection.

Latency service database 312 may also be integrated together with system 100 (e.g., within memory 102 of system 100) in some examples, while being implemented separately from system 100 (and being communicatively coupled thereto) in other examples. Latency service database 312 may be configured to store various data associated with a service offering described herein or another such latency service as may serve a particular implementation. For example, after determining a characteristic of a geographic zone at a particular time (e.g., as performed at operation 206 of method 200, as described above), system 100 may add data (e.g., a data entry) to latency service database 312. For instance, the data entry may be representative of the characteristic of the geographic zone and the time at which the characteristic of the geographic zone was determined. Data entries stored within latency service database 312 in this way may be accessed later by system 100 or by other systems (e.g., assignment server 314, service support system 316, etc.) to facilitate any of the operations that these systems are tasked with as described herein or as may serve a particular implementation.

Assignment server 314 may also, as with latency tracking system 310 and latency service database 312, be integrated together with system 100 (e.g., implemented by resources of a compute node such as a MEC server or the like) or be implemented as a separate system communicatively coupled with system 100. As shown, assignment server 314 may be included within distributed computing network 302 and may be in communication with compute nodes 304 by way of distributed computing network 302. Assignment server 314 may assist system 100 (e.g., performing operations based on direction from system 100) in arranging for the performance of distributed computing services by certain compute nodes 304 for certain UE devices 306. For example, after system 100 determines (e.g., based on latency performance levels and/or characteristics of geographic zones) that a particular compute node 304 is to perform a particular distributed computing service for a particular UE device 306, assignment server 314 may perform various operations under direction of system 100 to realize the distributed computing service assignment and/or to otherwise help arrange for the performance of the distributed computing service by distributed computing network 302. To this end, for instance, assignment server 314 may include or be associated with an input firewall, a traffic steering module (e.g., routing equipment, etc.), equipment for ensuring quality of service (QoS) parameters, and so forth.

Service support system 316 may represent yet another part of the overall system that may interoperate with system 100 (e.g., by being integrated with or being implemented separately from and communicatively coupled with system 100) to implement distributed computing services (e.g., including Latency as a Service (LaaS) offerings) for UE devices 306 and users 308. Service support system 316 may include an operations support system (OSS), a business support system (BSS), and/or other such systems configured to administer the distributed computing services, to provide billing and support services for the distributed computing services, and/or to otherwise successfully provide distributed computing and/or service offerings as described herein. In some examples, system 100 may provide data representative of the characteristic of the geographic zone and the time at which the characteristic of the geographic zone was determined (e.g., the same or similar data stored in latency service database 312 as described above) to service support system 316 for system administration purposes, billing purposes, and/or other distributed computing concerns as may serve a particular implementation.

For example, dashboard 318 may represent a visualization (e.g., an annotated map, etc.) of the geographic zones in which UE devices 306 are located and the characteristics thereof, which may be created by system 100 and provided to operator 320 by way of service support system 316 to facilitate administration and operation of system 100 and the distributed computing services that system 100 provides. More particularly, for instance, system 100 may generate map data representative of a map depicting a real-time graphical representation of boundaries for one or more geographic zones and one or more corresponding characteristics of the geographic zones. System 100 may then provide the map data to service support system 316, which may be configured to present (e.g., in real time and based on the map data) the map to operator 320 by way of dashboard 318 as operator 320 helps operate and administer distributed computing network 302. Moreover, while not explicitly shown in FIG. 3, it will be understood that system 100 may provide (e.g., directly or by way of service support system 316) similar data to users 308 as is provided to operator 320. Specifically, for example, system 100 may generate the map data representative of the map depicting the graphical representation of the boundaries for the geographic zones and the characteristics of the geographic zones, and may then provide the map data to one or more of UE devices 306 to present (e.g., based on the map data) the map to respective users 308 of the one or more UE devices 306.

Operator 320 may use the map provided by dashboard 318 in any suitable way to facilitate system 100 in effectively and efficiently operating and administering distributed computing network 302. For instance, along with automatic management operations performed by system 100 in ways described herein, operator 320 may oversee and/or direct administration of the distributed computing network in any manner as may serve a particular implementation. For example, by being able to see areas that are congested or experiencing delay in real-time, operator 320 may take measures to divert network traffic or network resources, to manually adjust zone boundaries and/or characteristics, to change or bring network resources online, and/or to otherwise administer and attempt to improve performance of distributed computing network 302 in accordance with real-time conditions of the network. As will be described in more detail below, these operations may all be performed automatically by system 100 under certain circumstances, or may be directed by operator 320 as appropriate.

Users 308 may also use this map information in various ways in implementations in which the map is provided to them. For example, by seeing that a particular area is congested and performing suboptimally in terms of latency performance at a certain time of day (e.g., a peak time when a user plans his or her commute), the user may take mitigating actions to avoid the congestion and suboptimal latency performance during his or her commute. For example, the user may decide to wait a little while for the congestion to subside (e.g., running an errand or talking with a friend, etc.) before beginning the commute, or the user may decide to use a different route (e.g., a different train line, etc.) to avoid the congested area and to be able to enjoy superior latency performance (e.g., highly responsive extended reality, etc.) during the commute.

Network usage data 322 may represent any form of data that is provided to each of UE devices 306 to indicate the network usage of the UE devices 306. The management and communication of network usage data 322 may be facilitated by service support system 316 in any suitable way. For example, based on the data stored over the course of an network usage period (e.g., a day, a month, etc.) in latency service database 312 and provided to service support system 316, accurate network usage statistics (e.g., invoices, service statements, etc.) may be provided to each user 308 of each UE device 306 in any suitable form (e.g., by way of paper mail, online invoicing by email or by login to a user account, automatic billing, etc.). Network usage data 322 may represent various or all of the distributed computing services consumed by the respective UE devices 306 over a period of time.

For certain users 308 subscribing to a guaranteed latency performance level, network usage data 322 may account for when the guaranteed latency performance was successfully provided, as well as, if applicable, instances when the guaranteed latency performance was not able to be provided (e.g., due to network congestion, resource contention above the capacity of distributed computing network 302, etc.) In this way, users 308 may have at least some visibility into actual network conditions day by day during a particular period. As such, users 308 may be assured that they received the latency performance level that they subscribed to, even though the actual latency performance the users experienced likely varied day to day in accordance with network conditions and other conditions.

Figure 4:
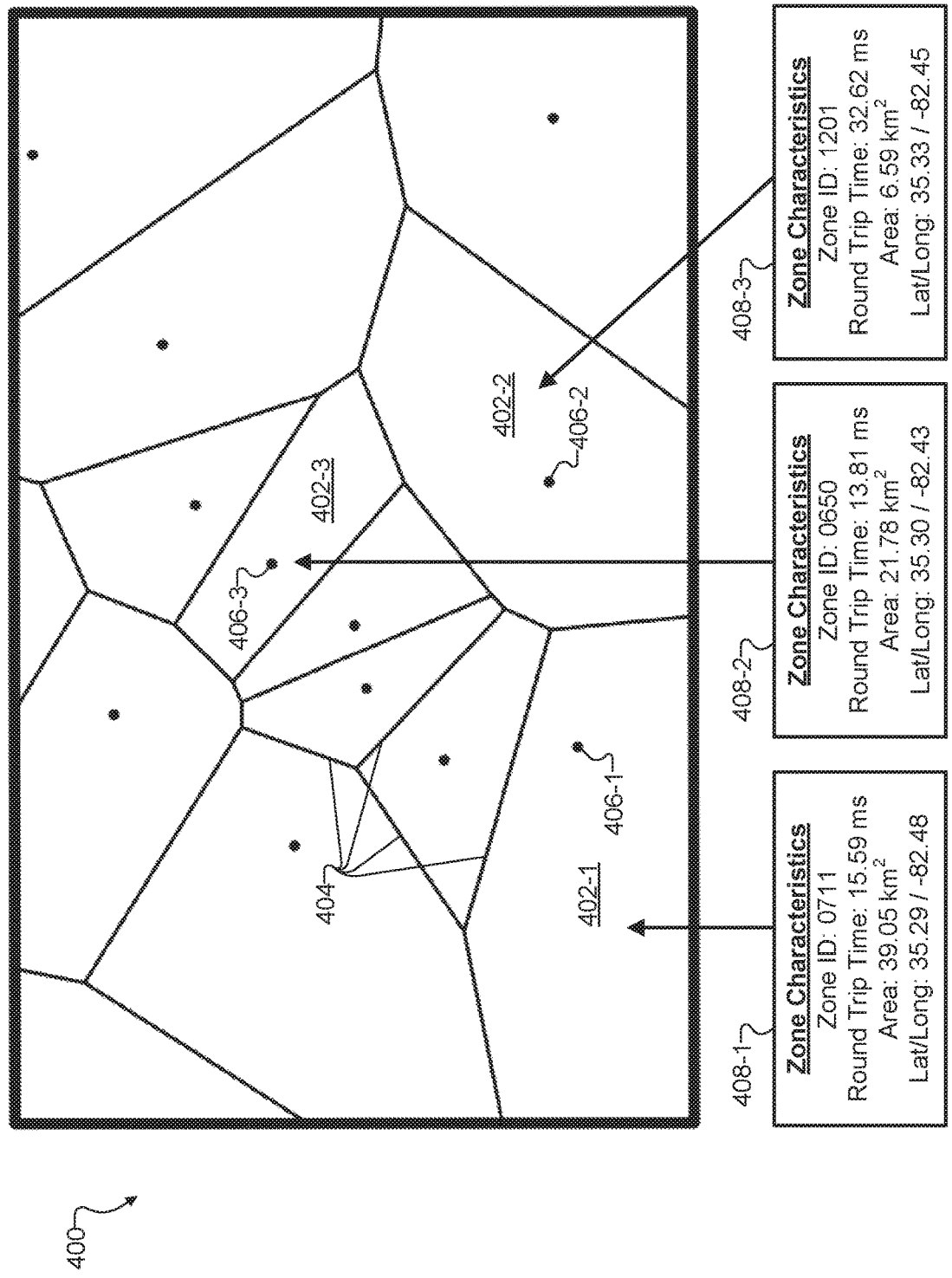
FIG. 4 shows an illustrative representation of network communication nodes, boundaries, and zone characteristics of various geographic zones of a distributed computing network according to embodiments described herein.

FIG. 4 shows an illustrative representation 400 of network communication nodes, boundaries, and zone characteristics of various geographic zones of a distributed computing network according to principles described herein. For example, representation 400 may be understood to represent geographic zones for a particular implementation of distributed computing network 302, and may be an example of the type of map that is represented by the map data generated by system 100 (e.g., and provided to service support system 316) as described above in relation to FIG. 3. It will be understood that the geographic zones of FIG. 4 (as well as the boundaries and characteristics thereof) may be managed (e.g., set, defined, updated, changed, detected, etc.) by system 100. In some examples, system 100 may manage the geographic zones automatically based on network conditions and other suitable criteria. Additionally or alternatively, system 100 may manage the geographic zones in connection with service support system 316 (e.g., based on direction from operator 320, as described above).

In representation 400, a plurality of geographic zones 402 are illustrated as different polygons superimposed over a map of a geographic area (specific elements of which are not explicitly shown in FIG. 4 for clarity of illustration). While only a few of the specific geographic zones 402 are labeled in FIG. 4 (i.e., a geographic zone 402-1, a geographic zone 402-2, and a geographic zone 402-3), it will be understood that each of the interlocking polygons shown within representation 400 may be referred to as a geographic zone 402 and may represent a particular geographical area within which UE devices 306 may be found (and from within which the UE devices 306 may request distributed computing services). Various boundaries 404 are shown to designate the respective boundaries of the geographic zones 402 throughout the geographic area represented by representation 400. Additionally, respective network communication nodes 406 (e.g., including a network communication node 406-1 within geographic zone 402-1, a network communication node 406-2 within geographic zone 402-2, a network communication node 406-3 within geographic zone 402-3, and other network communication nodes 406 that are not explicitly labeled within the other geographic zones 402) are illustrated as small dots within each of the geographic zones 402.

Below the map portion of representation 400 (outlined by the thick dark rectangle), certain zone characteristics 408 associated with a few specific geographic zones 402 are shown with arrows pointing to the corresponding zones. Specifically, as shown, zone characteristics 408-1 are associated with geographic zone 402-1, zone characteristics 408-2 are associated with geographic zone 402-2, and zone characteristics 408-3 are associated with geographic zone 402-3. While other characteristics 408 of other geographic zones are not explicitly shown within representation 400 in FIG. 4, it will be understood that these characteristics may likewise be determined by system 100 and may be represented in any manner as may serve a particular implementation (e.g., by replacing one of zone characteristics 408-1 through 408-3 when operator 320 selects a different geographic zone 402 to focus on using dashboard 318, etc.). Each of the elements of representation 400 will now be described in more detail.

Geographic zones 402 may be defined, differentiated, and managed in any suitable manner. For example, geographic zones 402 may be defined by radio spectrum and may not change based on network traffic but based on certain network conditions such as when a particular network communication node 406 experiences issues (e.g., goes offline for maintenance, etc.).

Boundaries 404 between geographic zones may be defined and managed by system 100 in accordance with these types of network conditions. For example, system 100 may define respective boundaries 404 for each geographic zone 402 based on respective geolocations of the network communication nodes 406 that are located within the geographic zones 402. For instance, as shown in FIG. 4, assuming that every illustrated network communication node 406 is currently online and operational, boundaries 404 are defined such that every point on the map at which a UE device may be located is within the same geographic zone 402 as the nearest network communication node 406. In this way, UE devices moving about within the geographic area shown by representation 400 may always be located within a zone associated with the nearest network communication node 406 to facilitate wireless connection to, and wireless communication with, distributed computing network 302 by way of that network communication node 406. It will be understood that boundaries 404 of geographic zones 402 may change dynamically as network conditions warrant (e.g., as certain network communication nodes 406 go offline or come online, etc.), and, in certain examples, based on latency performance measured between UE devices and compute nodes. Specific locations of these dynamically changing boundaries may be included among the characteristics of the geographic zones 402 that are recorded (e.g., within latency service database 312, etc.) such that these details may be preserved for accurate invoicing and the like.

Each network communication node 406 may represent any suitable components of distributed computing network 302 that enable or facilitate communication between a UE device 306 and the distributed computing network while the UE device 306 is located in a particular geographic zone with the network communication node 406. For example, each network communication node 406 may represent a cell tower of a cellular network (e.g., a gNodeB, an eNodeB, etc.) and/or any network equipment associated therewith (e.g., RAN resources, etc.). In some examples, compute nodes 304 may be co-located with the network communication node 406, while, in other examples, compute nodes 304 may be separate and independent from network communication nodes 406 (as will be illustrated in more detail below). In any case, each UE device 306 may be configured to communicate with a compute node 304 assigned to perform a distributed computing service for the UE device 306 by way of the network communication node 406 of the geographic zone 402 within which the UE device 306 is presently located.

Respective sets of zone characteristics such as illustrated by zone characteristics 408 may be associated with each geographic zone 402, and may include any of various types of characteristics as may serve a particular implementation. For instance, as illustrated in the example of representation 400, the zone characteristics of one particular geographic zone 402 may include a zone identifier (Zone ID), a current latency performance measure (Round Trip Time), a total area of the geographic zone 402 (Area), and a geographical location (e.g., measured in latitude and longitude or another suitable format) or address indicative of the location (Lat/Long).

Similar to boundaries 404 described above, zone characteristics 408 may change dynamically and, as such, may be continuously tracked and managed by system 100 as network conditions warrant. However, in contrast with boundaries 404 (which may not necessarily be affected by current network traffic and/or congestion), certain zone characteristics 408 may be significantly affected by or based on network conditions such as current network traffic and/or congestion. In particular, based on resource contention and resource availability of various compute nodes 304 (e.g., how highly demanded the compute nodes are at a particular moment in time, how much capacity the compute nodes have, etc.), the latency performance (e.g., round trip time) that a particular geographic zone 402 is capable of providing may remain in constant flux. As a result, one characteristic of each geographic zone 402 that is tracked and maintained within zone characteristics 408 may be either an upper or lower bound of latency performance (or both) that distributed computing network 302 is capable of providing to UE devices 306 located within a boundary 404 defined for a particular geographic zone 402 at a particular time.

For example, at the time illustrated in FIG. 4, UE devices 306 subscribing to a particular latency performance level and located within geographic zone 402-1 may expect a latency performance of no more than 15.59 ms of delay (in terms of round trip time between the UE device and the compute node) if the Round Trip Time characteristic shown in zone characteristics 408-1 is an upper bound. Conversely, if the Round Trip Time characteristic represents a lower bound, UE devices 306 subscribing to a particular latency performance level and located within geographic zone 402-1 at this time may expect a latency performance of no less than 15.59 ms of delay. As will be described in more detail below, upper and lower bounds may be more or less relevant to different UE devices based on the different types of latency performance levels to which the UE devices may be subscribed. Other example latency performance bounds determined as characteristics of other geographic zones 402 are shown in zone characteristics 408-2 (Round Trip Time: 13.81 ms) and 408-3 (Round Trip Time: 32.62 ms).

In certain examples, each geographic zone 402 may be color coded within representation 400 based on the latency performance bounds that the zone is currently capable of providing. For example, different colors may be used to illustrate zones with latency performance bounds less than 10 ms, between 10-15 ms, between 15-20 ms, between 20-25 ms, between 25-30 ms, between 30-35 ms, and greater than 35 ms in a particular implementation. As illustrated by these varying characteristics, UE devices located in different geographic zones 402 may expect latency performance that varies relatively widely based on network conditions and geographic location. However, as will be described in more detail below, a UE device subscribing to a relatively high latency performance level may consistently expect to receive superior latency performance as compared to latency performance received by UE devices subscribed to lower latency performance levels.

Figure 5:
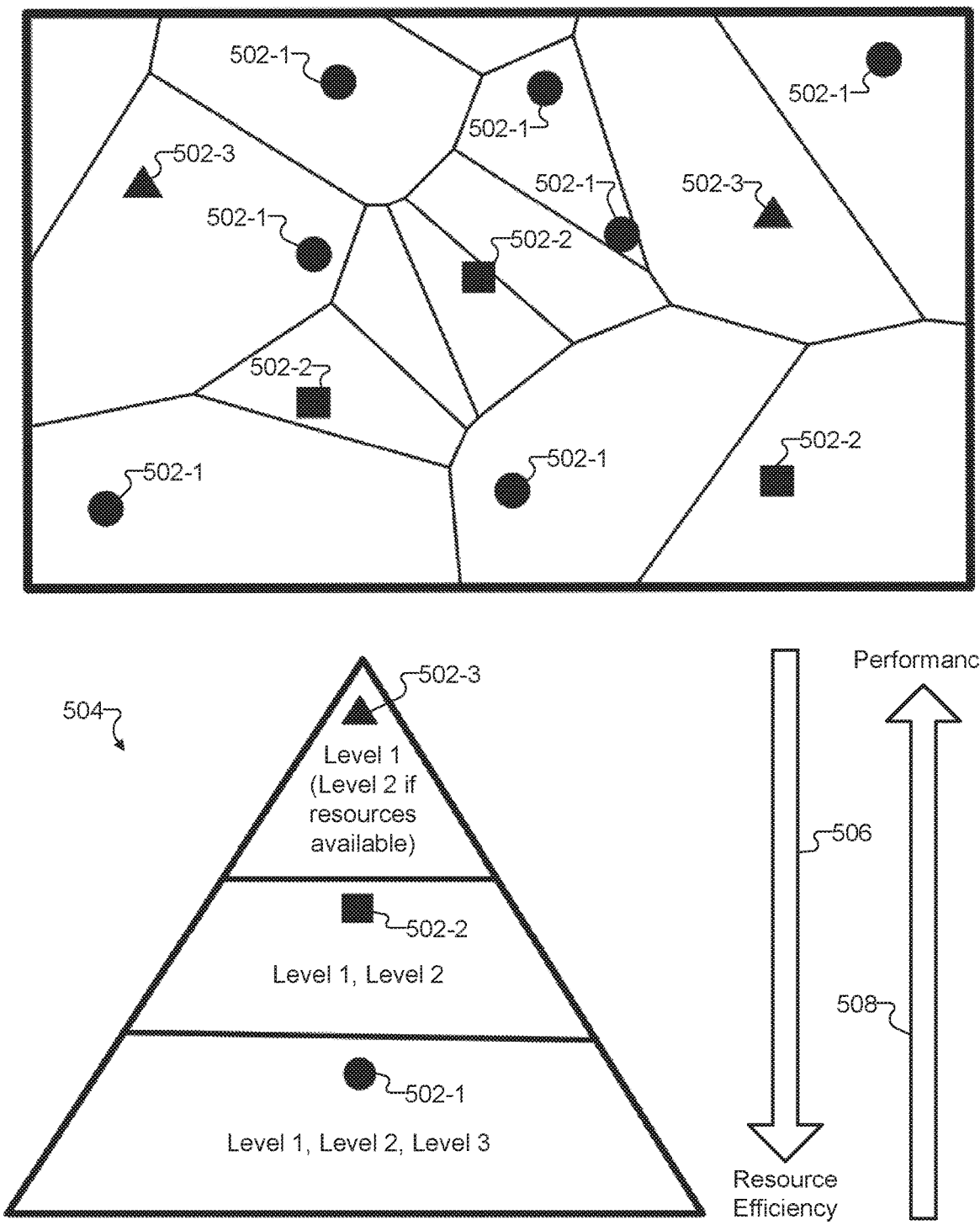
FIG. 5 shows certain aspects of various illustrative compute nodes that may be included within a distributed computing network according to embodiments described herein.

FIG. 5 shows certain aspects of various illustrative compute nodes 502 that may be included within a distributed computing network in accordance with principles described herein. For example, compute nodes 502 may represent specific instantiations of compute nodes 304 of distributed computing network 302 described above. In FIG. 5, different types of compute nodes 502 are labeled with different reference designators (i.e., 502-1, 502-2, and 502-3), are drawn with different shapes (i.e., circles, squares, and triangles), and will be referred to, respectively, as good, better, and best performance compute nodes. More specifically, as shown, a relatively large number of good performance compute nodes 502-1 (also referred to as good nodes 502-1) are illustrated using circle shapes on the map, a smaller number of better performance compute nodes 502-2 (also referred to as better nodes 502-2) are illustrated using square shapes on the map, and an even smaller number of best performance compute nodes 502-3 (also referred to as best nodes 502-3) are illustrated using triangle shapes on the map.

Compute nodes 502 are shown to be overlaid onto the polygons of geographic zones 402 of representation 400 described above (it is noted that explicit labels for geographic zones 402 and boundaries 404, as well as network communication nodes 406, are omitted from FIG. 5 to reduce clutter). As mentioned above, in this example, compute nodes 502 are implemented as separate and independent from network communication nodes 406 (e.g., rather than being co-located with and/or dependent on network communication nodes 406, as may be the case in other implementations). Accordingly, as shown, geographic zones 402 do not map one-to-one with compute nodes 502 in the same way that they map one-to-one with network communication nodes 406 (i.e., certain geographic zones 402 are shown to include more than one compute node 502 while other geographic zones 402 are shown to not include any compute node 502).

A pyramid structure 504 illustrates how a resource efficiency 506 and a processing performance 508 may be distributed between the different types of compute nodes 502. Specifically, as shown, resource efficiency 506 is shown to be maximized by good nodes 502-1, while processing performance 508 is shown to be maximized by best nodes 502-3. For example, best nodes 502-3 may be understood to include an abundance of GPU resources and every type of hardware assist or offload engine technology available to ensure that distributed computing services assigned to these nodes are performed quickly and with a minimal amount of processing latency. Better nodes 502-2 may include some of these types of resources, but may not be so well equipped as best nodes 502-3. For instance, better nodes 502-2 may include high performance CPUs and I/O devices, highly optimized inference engines, and the like, but may not include the same abundance of GPU resources and hardware assist technologies such that the processing latency performance provided by these nodes may be inferior to that provided by best nodes 502-3. Good nodes 502-1 may be the most common type of compute node 502 and may share computing resources to a greater extent so as to provide the most efficient computing in a way that cannot match the processing performance of better nodes 502-2 and best nodes 502-3. For example, resource contention, resource abundance, and cost efficiencies may all be maximized by good nodes 502-1.

As has been described, system 100 may arrange for the performance of distributed computing services for UE devices based on latency performance level and real-time characteristics of geographic zones in which the UE devices are located. To select an appropriate compute node 502 to perform a requested distributed computing service, system 100 may account for the latency performance level to which a given UE device is subscribed in any of the ways described herein. For example, the latency performance level to which a UE device is subscribed may be one of a plurality of latency performance levels that includes: 1) a first latency performance level associated with a guarantee to provide at least a particular latency performance (e.g., a Gold latency performance level referred to as Level 1 in FIG. 5), 2) a second latency performance level lower than the first latency performance level and associated with a best effort to provide at least the particular latency performance but not associated with a guarantee (e.g., a Silver latency performance level referred to as Level 2 in FIG. 5), and 3) a third latency performance level lower than the second latency performance level and associated with providing latency performance that varies with a real-time condition of the distributed computing network and that is not associated with a best effort to provide at least the particular latency performance (e.g., a Bronze latency performance level referred to as Level 3 in FIG. 5).

In the node selection process performed as part of the arranging and orchestrating done by system 100, the highest performance computing nodes (i.e., best computing nodes 502-3) are shown to generally be reserved for Level 1 (Gold) subscribers who have subscribed for a guaranteed high level of latency performance. Only when all Level 1 subscribers are being provided the guaranteed latency performance and when resource availability remains within best nodes 502-3 may system 100 assign best nodes 502-3 to perform distributed computing services for Level 2 (Silver) subscribers. Otherwise, Level 2 subscribers are limited to being served by better nodes 502-2 or good nodes 502-1. Regardless of network conditions, system 100 may always select good nodes 502-1 to perform distributed computing services for Level 3 (Bronze) subscribers.

While best nodes 502-3 may typically never be selected to perform distributed computing services for UE devices subscribing to the Level 3 latency performance level (except when there is excess unused capacity), it is noted that good nodes 502-1 may be selected to perform distributed computing services not only for UE devices subscribing to the Level 3 latency performance level, but also for UE devices subscribing to the Level 2 and/or Level 1 latency performance levels. For example, during non-peak times and/or in certain resource rich geographies, system 100 may determine that the guaranteed latency performance that is to always be provided to the Level 1 subscribers may be achieved by a better node 502-2 or even by a good node 502-1. In these examples, efficiency may be increased (and resource costs therefore decreased) by assigning these more efficient types of compute nodes 502 to perform the distributed computing services for the Level 1 subscribers. The same may be true of Level 2 subscribers in this example and these principles may likewise be applied to other implementations that include more or fewer types of compute nodes and/or available latency performance levels.

FIGS. 6-9 show various illustrative orchestrations of distributed computing services for various UE devices under various circumstances according to principles described herein. In FIGS. 6-9, new geographic zones, UE devices, and compute nodes are introduced for each different figure to indicate that each of the examples illustrated by the different figures is independent and separate from the other examples. However, it will be understood that each of the geographic zones may be implemented by the same types of geographic zones described in more detail above (e.g., geographic zones 402), that each of the UE devices may be implemented by the same types of UE devices described in more detail above (e.g., UE devices 306), and that each of the compute nodes may be implemented by the same types of compute nodes described in more detail above (e.g., compute nodes 304, any of the different types of compute nodes 502, etc.).

Figure 6:
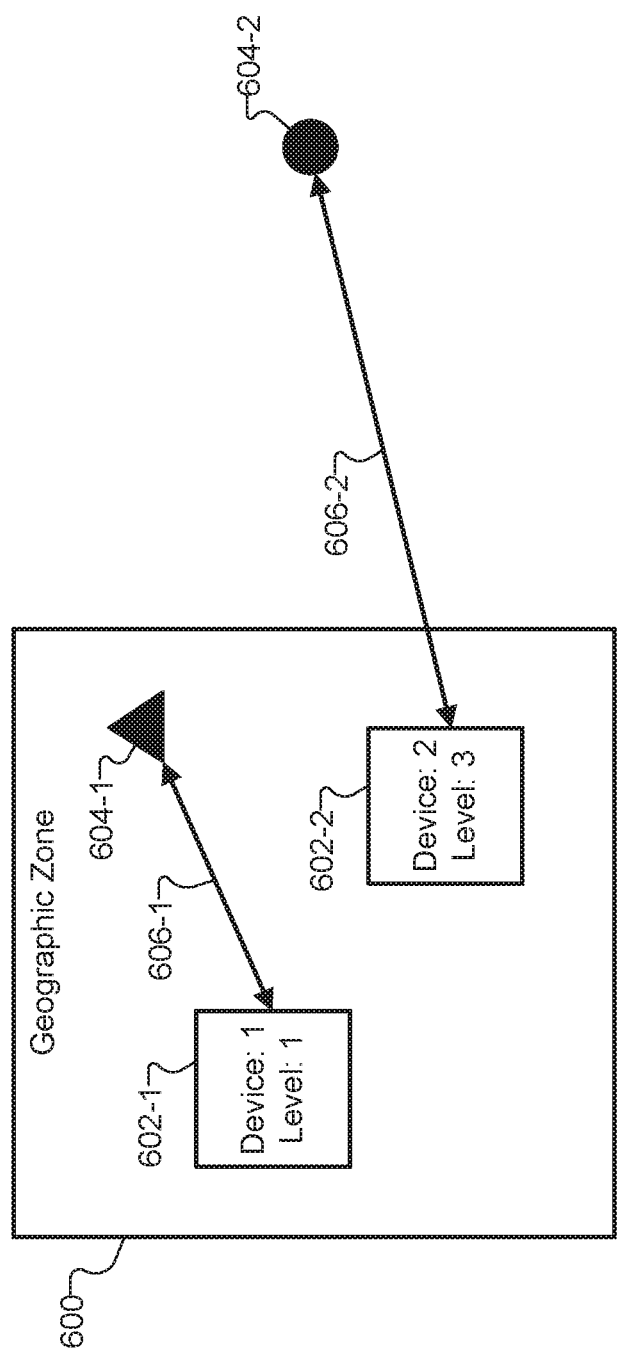
FIGS. 6-9 show various illustrative orchestrations of distributed computing services for various UE devices under various circumstances according to embodiments described herein.

To illustrate a first example orchestration, for instance, FIG. 6 depicts a geographic zone 600 that includes two different UE devices 602 (i.e., UE devices 602-1 and 602-2). FIG. 6 also shows two different compute nodes 604 (i.e., compute nodes 604-1 and 604-2) that may each be within range to be viable candidates for performing distributed computing services requested by UE devices 602. However, as is depicted both by the different shapes of compute nodes 604 and by the relative distance of the compute nodes 604 from both of the UE devices 602, it will be understood that compute node 604-1 will be expected to provide superior latency performance to either of UE devices 602 if it is selected over compute node 604-2 to perform a requested distributed computing service. More specifically, compute node 604-1 may be expected to have a better transit latency than compute node 604-2 due to its closer proximity to UE devices 602 (within geographic zone 600 rather than outside of the zone like compute node 604-2), as well as a better performance latency due to compute node 604-1 being a best performance compute node (indicated by the triangle shape) while compute node 604-2 may be a good performance compute node (indicated by the circle shape).

As shown, UE device 602-1 may be a Level 1 (Gold) subscriber in terms of the latency performance level to which the UE device is subscribed, while UE device 602-2 may be a Level 3 (Bronze) subscriber. Accordingly, an orchestration 606-1 is shown to be arranged by system 100 to direct compute node 604-1 to perform a distributed computing service requested by UE device 602-1, while an orchestration 606-2 is shown to be arranged by system 100 to direct compute node 604-2 to perform a distributed computing service requested by UE device 602-2. To implement these orchestrations 606, system 100 may perform certain operations in addition to the operations described above in relation to method 200 to effectively orchestrate distributed computing services based on the different latency performance levels of UE devices 602. For example, along with identifying the latency performance level of UE device 602-1 (i.e., the Level 1 latency performance level) in response to a request by UE device 602-1 at operation 202, system 100 may further identify, in response to an additional request by UE device 602-2 for performance of an additional distributed computing service, the latency performance level to which UE device 602-2 is subscribed (i.e., the Level 3 latency performance level). As described above, this additional latency performance level of UE device 602-2 may be lower than the latency performance level of UE device 602-1, and UE device 602-2 may likewise be located in geographic zone 600 with UE device 602-1.

Along with arranging, based on the Level 1 latency performance level of UE device 602-1, for the performance of the distributed computing service for UE device 602-1 at operation 208, system 100 may further arrange, based on the Level 3 latency performance level of UE device 602-2 (as well as the same characteristics of geographic zone 600 that may have been determined at operation 206), for the performance of the additional distributed computing service for UE device 606-2.

Specifically, the arranging for the performance of the first distributed computing service (for UE device 602-1) may include assigning compute node 604-1 to perform the first distributed computing service (as illustrated by orchestration 606-1). In contrast, the arranging for the performance of the additional distributed computing service (for UE device 602-2) may include assigning compute node 604-2 to perform the additional distributed computing service (as illustrated by orchestration 606-2). For the reasons described above (e.g., as a result of a greater physical distance from UE devices 602 and/or inferior computing resources in the good performance compute node), compute node 604-2 may provide latency performance inferior to latency performance provided by compute node 604-1. For example, compute node 604-2 may be selected in this example to maximize efficiency of orchestration 606-2 while still meeting latency performance parameters to which both UE devices 602 have subscribed.

Figure 7:
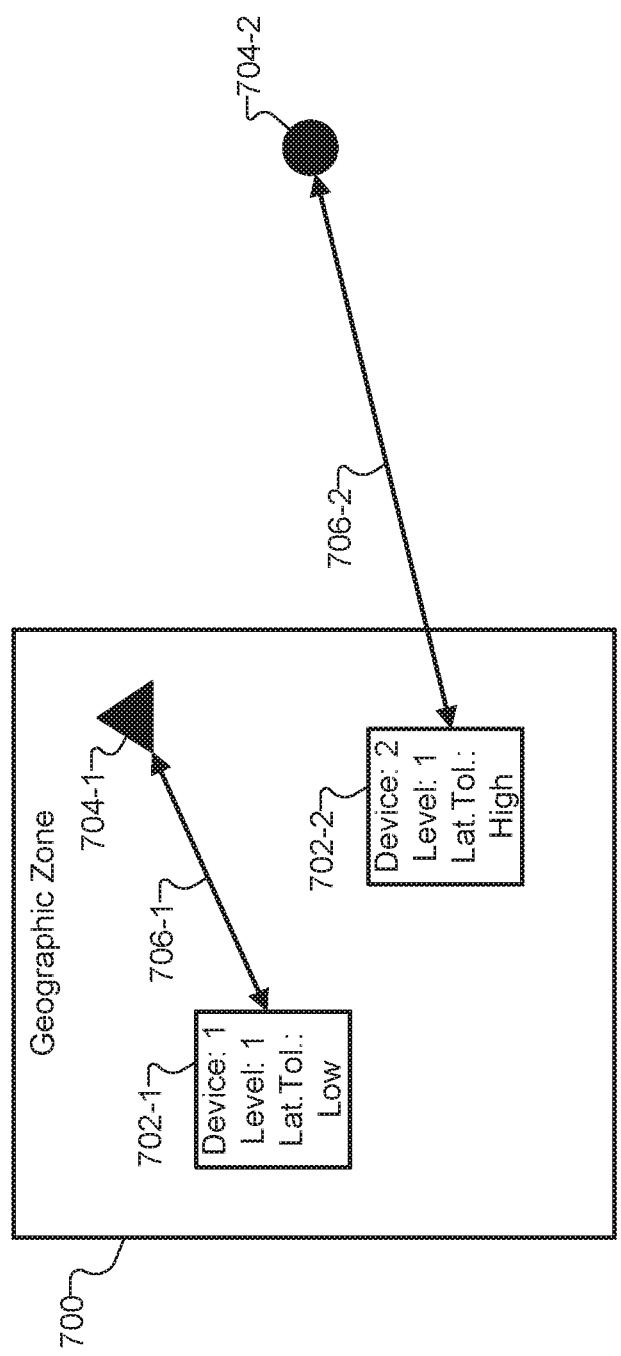

To illustrate another example orchestration, FIG. 7 depicts a geographic zone 700 that includes two different UE devices 702 (i.e., UE devices 702-1 and 702-2). FIG. 7 also shows two different compute nodes 704 (i.e., compute nodes 704-1 and 704-2) that may each be within range to be viable candidates for performing distributed computing services requested by UE devices 702. However, similar to compute nodes 604 described above (and as similarly depicted by the different shapes and relative distances of compute nodes 704 from UE devices 702), it will be understood that compute node 704-1 will be expected to provide superior latency performance to either of UE devices 702 if it is selected over compute node 704-2 to perform a requested distributed computing service.

As shown, both UE devices 702 may be Level 1 (Gold) subscribers in terms of the latency performance level to which the UE devices are subscribed. However, as indicated by the different latency tolerances (Lat. Tol.) depicted with respect to each UE device 702 in FIG. 7, it will be understood that the distributed computing services requested by these UE devices may have different latency tolerances (e.g., different maximum latency parameters that may be acceptable for the distributed computing services). For example, as shown, the distributed computing service requested by UE device 702-1 may have a Low latency tolerance (e.g., thus requiring a high level of latency performance and a short delay), while the distributed computing service requested by UE device 702-2 may have a High latency tolerance (e.g., thus not necessarily requiring the same high level of latency performance and the same short delay). The difference in latency tolerance may be due to the different respective natures of the different distributed computing services being requested, as only certain distributed computing services are highly latency sensitive and others are not (e.g., such that the user may not notice or care whether these less latency-sensitive services are performed with delays of 10 ms or a full 1-2 seconds).

Though both UE devices 702 are subscribed to the same high performance latency performance level (i.e., Gold Level 1 in this example), FIG. 7 shows that an orchestration 706-1 is arranged by system 100 to direct compute node 704-1 to perform a distributed computing service requested by UE device 702-1, while an orchestration 706-2 is arranged by system 100 to direct compute node 704-2 to perform a distributed computing service requested by UE device 702-2. To implement these orchestrations 706, system 100 may perform certain operations in addition to the operations described above in relation to method 200 to effectively orchestrate distributed computing services based on the different latency tolerance levels of UE devices 702. For example, system 100 may determine, in response to requests for performance of distributed computing services for UE devices 702, respective latency tolerances associated with each of the distributed computing services that has been requested (e.g., at operation 202 and/or in a similar operation). The arranging for the performance of the distributed computing services (e.g., at operation 202 and/or in a similar operation) may then be performed by system 100 further based on the determined latency tolerances.

For instance, system 100 may assign, for the performance of the distributed computing services, respective compute nodes that satisfy the respective latency tolerances of the distributed computing services while also targeting a maximum resource efficiency for each distributed computing service. As specifically shown in FIG. 7, for example, system 100 may assign compute node 704-1 for performance of the distributed computing service requested by UE device 702-1 because the high level of latency performance provided only by compute node 704-1 may be required for the Low latency tolerance of UE device 702-1. In contrast, system 100 may assign compute node 704-2 for performance of the distributed computing service requested by UE device 702-2 because the lower level of latency performance that compute node 704-2 is still capable of providing may satisfy the High latency tolerance while being more resource efficient than an assignment to compute node 704-1.

Figure 8:
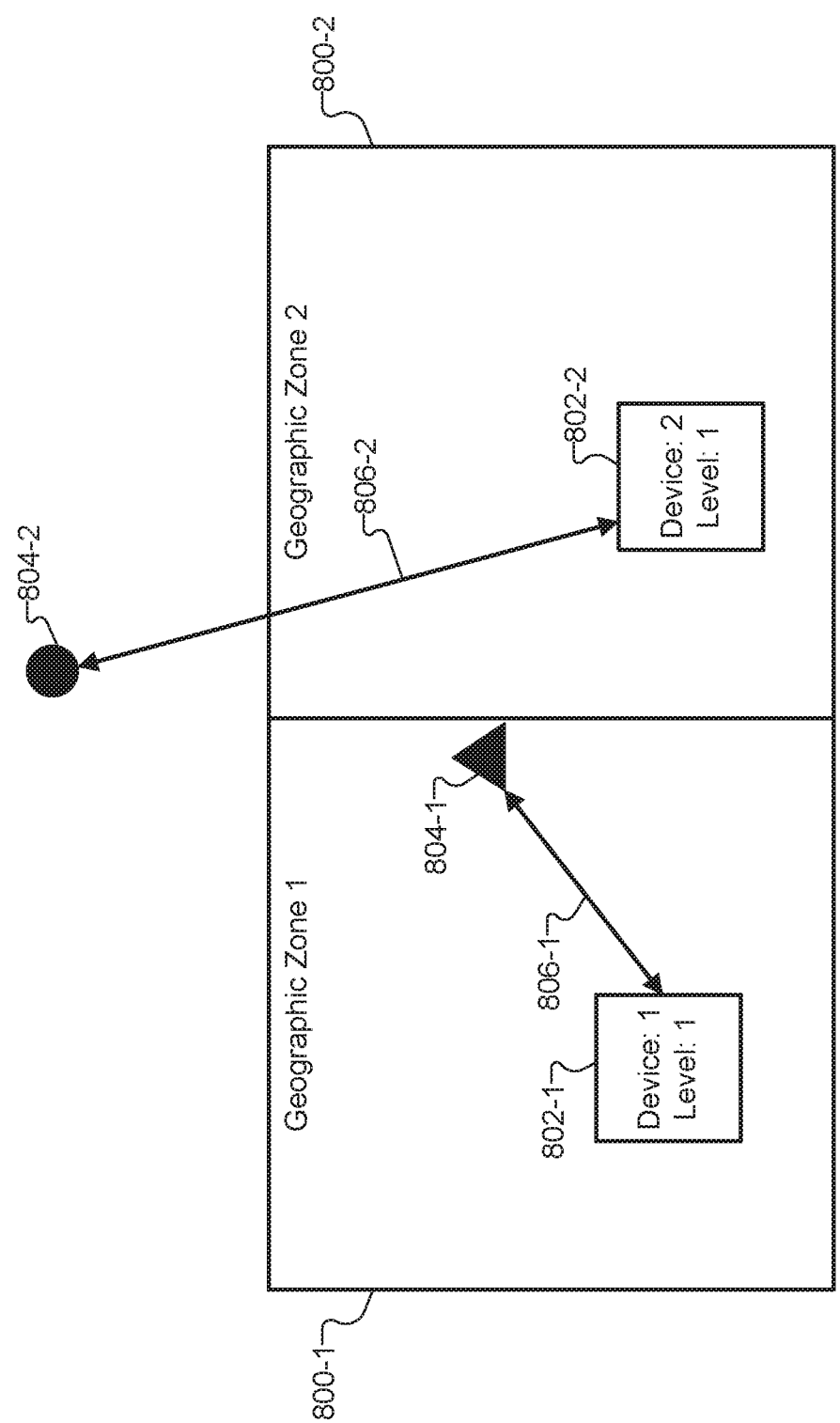

To illustrate another example orchestration, FIG. 8 depicts two geographic zones 800 (e.g., geographic zones 800-1 and 800-2) that collectively include two different UE devices 802 (i.e., UE device 802-1 in geographic zone 800-1 and UE device 802-2 in geographic zone 800-2). FIG. 8 also shows two different compute nodes 804 (i.e., compute nodes 804-1 and 804-2) that may each be within range to be viable candidates for performing distributed computing services requested by UE devices 802. However, similar to compute nodes 604 and 704 described above (and as similarly depicted by the different shapes and relative distances of compute nodes 804 from UE devices 802), it will be understood that compute node 804-1 will be expected to provide superior latency performance to either of UE devices 802 if it is selected over compute node 804-2 to perform a requested distributed computing service.

As shown, both UE devices 802 may be Level 1 (Gold) subscribers in terms of the latency performance level to which the UE devices are subscribed. However, due to different zone characteristics that may be associated with the different geographic zones 800 that the UE devices 802 are located within, the latency performance provided to each UE device 802 may be different. For example, an orchestration 806-1 is shown to be arranged by system 100 to direct compute node 804-1 to perform a distributed computing service requested by UE device 802-1, while an orchestration 806-2 is shown to be arranged by system 100 to direct compute node 804-2 to perform a distributed computing service requested by UE device 802-2. It may be assumed for this example (though not explicitly shown in FIG. 8) that both distributed computing services requested by UE devices 802 have an equal or similar latency tolerance (e.g., a Low latency tolerance).

System 100 may perform certain operations in addition to the operations described above in relation to method 200 in order to effectively orchestrate distributed computing services based on different zone characteristics of the different geographic zones 800-1 and 800-2 within which UE devices 802-1 and 802-2 are respectively located. For example, along with identifying the latency performance level of UE device 802-1 (i.e., the Level 1 latency performance level) in response to a request by UE device 802-1 at operation 202, system 100 may further identify, in response to an additional request by UE device 802-2 for performance of an additional distributed computing service, the latency performance level to which UE device 802-2 is subscribed (i.e., also the Level 1 latency performance level in this example). As mentioned, this additional latency performance level of UE device 802-2 may be equal to the latency performance level of UE device 802-1, and UE device 802-2 may be located in a different geographic zone 800 than UE device 802-1.

Along with determining a characteristic of geographic zone 800-1 (e.g., at operation 206 based on real-time latency performance data obtained at operation 204), system 100 may further determine, based on the same or other real-time latency performance data obtained as part of operation 204, a characteristic of geographic zone 800-2. For example, this additional characteristic may be associated with latency performance that the distributed computing network is capable of providing in geographic zone 800-2.

Additionally, along with arranging, based on the Level 1 latency performance level of UE device 802-1, for the performance of the distributed computing service for UE device 802-1 at operation 208, system 100 may further arrange, based on the additional characteristic determined for geographic zone 800-2 (as well as based on the Level 1 latency performance level of UE device 802-2), for the performance of the additional distributed computing service for UE device 802-2. Specifically, the arranging for the performance of the first distributed computing service (for UE device 802-1) may include assigning compute node 804-1 to perform the first distributed computing service (as illustrated by orchestration 806-1). In contrast, the arranging for the performance of the additional distributed computing service (for UE device 802-2) may include assigning compute node 804-2 to perform the additional distributed computing service (as illustrated by orchestration 806-2). For the reasons described above (e.g., as a result of a greater physical distance from UE devices 802 and/or inferior computing resources in the good performance compute node), compute node 804-2 may provide latency performance inferior to latency performance provided by compute node 804-1. For example, geographic zone 800-1 may currently have fewer Level 1 subscribers competing for use of a best node like compute node 804-1 than may be competing within geographic zone 800-2.

Figure 9:
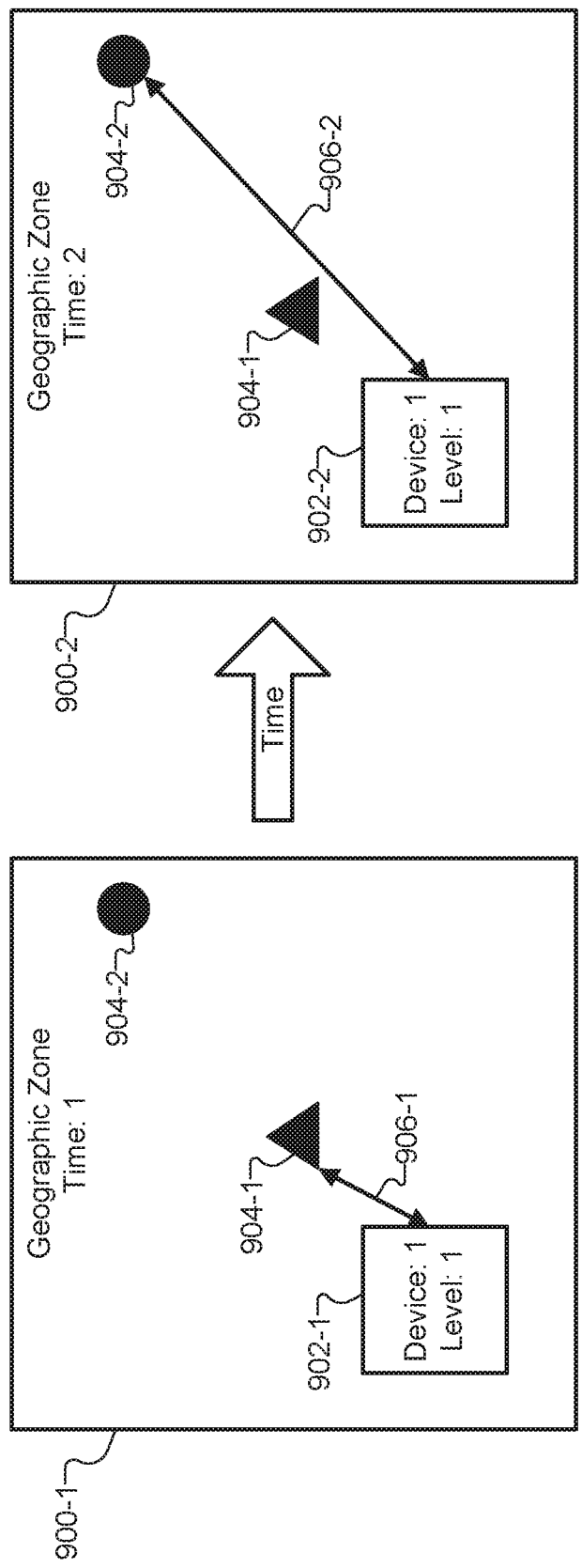

To illustrate yet another example orchestration, FIG. 9 depicts a single geographic zone 900 at two different times (e.g., labeled as geographic zone 900-1 at Time 1 and as geographic zone 900-2 at Time 2). For example, Time 1 and Time 2 may represent different times of day (e.g., during peak hours and non-peak hours for traffic congestion), different times of the week, different times of the month, different times of the year, or any other two different times when network conditions are such that zone characteristics of geographic zone 900 may not be the same. A same UE device 902 is shown to be included within geographic zone 900 at each of the two different times (e.g., labeled as UE device 902-1 at Time 1 and as UE device 902-2 at Time 2). FIG. 9 also shows two different compute nodes 904 (i.e., compute nodes 904-1 and 904-2) that may each be within range to be viable candidates for performing distributed computing services requested at the different times by UE device 902. However, similar to compute nodes 604, 704, and 804 described above (and as similarly depicted by the different shapes and relative distances of compute nodes 904 from UE device 902), it will be understood that compute node 904-1 will be expected to provide superior latency performance to UE device 902 if it is selected over compute node 904-2 to perform a requested distributed computing service at either Time 1 or Time 2.

As shown, UE device 902 may be a Level 1 (Gold) subscriber in terms of the latency performance level to which the UE device is subscribed. However, due to varying zone characteristics that may be associated with geographic zone 900 at the two different times at which UE device 902 is located within geographic zone 900, the latency performance provided to UE device 902 may vary at Time 1 and Time 2. For example, an orchestration 906-1 is shown to be arranged by system 100 to direct compute node 904-1 to perform a distributed computing service requested by UE device 902 at Time 1, while an orchestration 906-2 is shown to be arranged by system 100 to direct compute node 904-2 to perform a distributed computing service requested by UE device 902 at Time 2. It may be assumed for this example (though not explicitly shown in FIG. 9) that both distributed computing services requested by UE device 902 at Times 1 and 2 have an equal or similar latency tolerance (e.g., a Low latency tolerance).

System 100 may perform certain operations in addition to the operations described above in relation to method 200 in order to effectively orchestrate distributed computing services based on different zone characteristics of geographic zones 900 at the different times (i.e., Time 1 and Time 2) during which UE device 902 is located within geographic zone 900. For example, system 100 may receive, at Time 1 when UE device 902 is located in the geographic zone, a request from UE device 902 for performance of a first distributed computing service. System 100 may also receive, at Time 2 when UE device 902 is also located in geographic zone 900 (and which, as mentioned above, may be different from Time 1), an additional request by UE device 902 for performance of an additional distributed computing service. Moreover, along with determining a characteristic of geographic zone 900 at Time 1 (e.g., at operation 206 based on real-time latency performance data obtained at operation 204), system 100 may further determine, based on the same or other real-time latency performance data obtained as part of operation 204, a characteristic of geographic zone 900 at Time 2. For example, this additional characteristic may be associated with latency performance that the distributed computing network is capable of providing in geographic zone 900 at Time 2.

Additionally, along with arranging, based on the Level 1 latency performance level of UE device 902 and the characteristic of geographic zone 900 at Time 1, for the performance of the distributed computing service for UE device 902 at Time 1 (e.g., at operation 208), system 100 may further arrange, based on the same Level 1 latency performance level and based on the additional characteristic determined for geographic zone 900 at Time 2, for the performance of the additional distributed computing service for UE device 902-2. Specifically, the arranging for the performance of the first distributed computing service (for UE device 902 at Time 1) may include assigning compute node 904-1 to perform the first distributed computing service (as illustrated by orchestration 906-1). In contrast, the arranging for the performance of the additional distributed computing service (for UE device 902 at Time 2) may include assigning compute node 904-2 to perform the additional distributed computing service (as illustrated by orchestration 906-2). For the reasons described above (e.g., as a result of a greater physical distance from the location of UE device 902 and/or inferior computing resources in the good performance compute node), compute node 904-2 may provide latency performance inferior to latency performance provided by compute node 904-1. For example, geographic zone 900 may have fewer Level 1 subscribers competing for use of a best node like compute node 904-1 at Time 1 than may be competing for the best node at Time 2.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
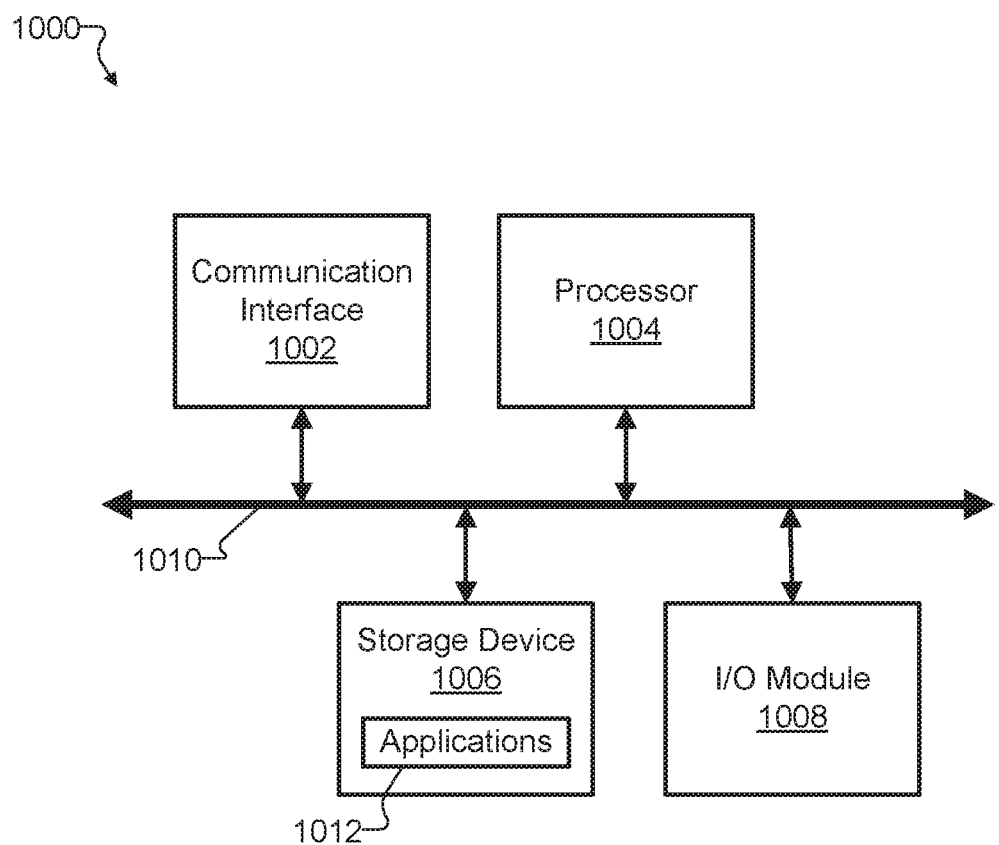
FIG. 10 shows an illustrative computing device according to embodiments described herein.

FIG. 10 shows an illustrative computing device 1000 that may be specifically configured to perform one or more of the processes described herein. For example, computing system 1000 may include or implement (or partially implement) a latency service system such as system 100 or any component included therein or associated therewith (e.g., a latency tracking system such as latency tracking system 310, a latency service database such as latency service database 312, an assignment server such as assignment server 314, a service support system such as service support system 316, etc.), a compute node such as one of compute nodes 304, a UE device such as one of UE devices 306, or any other computing systems or devices described herein.

As shown in FIG. 10, computing system 1000 may include a communication interface 1002, a processor 1004, a storage device 1006, and an input/output (I/O) module 1008 communicatively connected via a communication infrastructure 1010. While an illustrative computing system 1000 is shown in FIG. 10, the components illustrated in FIG. 10 are not intended to be limiting. Additional or alternative components may be used in other embodiments. Components of computing system 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a latency service system in response to a request by a user equipment (UE) device for performance of a distributed computing service, a particular latency performance level to which the UE device is subscribed, the particular latency performance level selected from a plurality of latency performance levels including:
      a first latency performance level associated with a guarantee to provide at least a particular latency performance,
      a second latency performance level associated with a best effort to provide at least the particular latency performance but not associated with the guarantee, and
      a third latency performance level associated with neither the guarantee nor the best effort to provide at least the particular latency performance, the third latency performance level providing a latency performance that varies with a real-time condition of a distributed computing network that is to perform the distributed computing service for the UE device; and
   fulfilling, by the latency service system, the request for the performance of the distributed computing service by:
      obtaining real-time latency performance data for the distributed computing network;
      determining, based on the real-time latency performance data, a characteristic of a geographic zone in which the UE device is located, the characteristic associated with latency performance that the distributed computing network is capable of providing in the geographic zone; and
      orchestrating, based on the particular latency performance level and the characteristic of the geographic zone, the performance of the distributed computing service for the UE device by the distributed computing network.

2. The method of claim 1, further comprising:
   adding, by the latency service system to a latency service database, data representative of the characteristic of the geographic zone and a time at which the characteristic of the geographic zone was determined; and
   providing, by the latency service system to a service support system, data representative of the characteristic of the geographic zone and the time at which the characteristic of the geographic zone was determined.

3. The method of claim 1, further comprising defining, by the latency service system, a boundary for the geographic zone, the boundary defined based on a geolocation of a network communication node that is located within the geographic zone and that enables communication between the UE device and the distributed computing network while the UE device is located in the geographic zone;
   wherein the characteristic of the geographic zone is an upper or lower bound of latency performance that the distributed computing network is capable of providing to UE devices located within the boundary defined for the geographic zone at a particular time.

4. The method of claim 3, further comprising:
   generating, by the latency service system, map data representative of a map depicting a real-time graphical representation of the boundary for the geographic zone and the characteristic of the geographic zone; and
   providing, by the latency service system, the map data to a service support system configured to present, in real time and based on the map data, the map to an operator associated with operating the distributed computing network.

5. The method of claim 3, further comprising:
   generating, by the latency service system, map data representative of a map depicting a graphical representation of the boundary for the geographic zone and the characteristic of the geographic zone; and
   providing, by the latency service system, the map data to the UE device to present, based on the map data, the map to a user of the UE device.

6. The method of claim 1, further comprising:
   determining, by the latency service system in response to an additional request by an additional UE device for performance of an additional distributed computing service, an additional latency performance level, of the plurality of latency performance levels, to which the UE device is subscribed, wherein the additional latency performance level is lower than the particular latency performance level and wherein the additional UE device is located in the geographic zone; and
   fulfilling, by the latency service system, the additional request for the performance of the additional distributed computing service by orchestrating, based on the additional latency performance level and the characteristic of the geographic zone, the performance of the additional distributed computing service for the additional UE device by the distributed computing network;
   wherein:
      the orchestrating of the performance of the distributed computing service includes assigning a first compute node of the distributed computing network to perform the distributed computing service, and the orchestrating of the performance of the additional distributed computing service includes assigning a second compute node of the distributed computing network to perform the additional distributed computing service, the second compute node providing latency performance inferior to latency performance provided by the first compute node.

7. The method of claim 1, further comprising:
determining, by the latency service system in response to an additional request by an additional UE device for performance of an additional distributed computing service, an additional latency performance level, of the plurality of latency performance levels, to which the UE device is subscribed, wherein the additional latency performance level is equal to the particular latency performance level and wherein the additional UE device is located in an additional geographic zone separate from the geographic zone; and
fulfilling, by the latency service system, the additional request for the performance of the additional distributed computing service by:
   determining, based on the real-time latency performance data, a characteristic of the additional geographic zone and associated with latency performance that the distributed computing network is capable of providing in the additional geographic zone; and
   orchestrating, based on the additional latency performance level and the characteristic of the additional geographic zone, the performance of the additional distributed computing service for the additional UE device by the distributed computing network;
wherein:
   the orchestrating of the performance of the distributed computing service includes assigning a first compute node of the distributed computing network to perform the distributed computing service, and
   the orchestrating of the performance of the additional distributed computing service includes assigning a second compute node of the distributed computing network to perform the additional distributed computing service, the second compute node providing latency performance inferior to latency performance provided by the first compute node.

8. The method of claim 1, further comprises:
receiving, by the latency service system and at a first time when the UE device is located in the geographic zone, the request from the UE device for performance of the distributed computing service;
receiving, by the latency service system and at a second time different from the first time and when the UE device is also located in the geographic zone, an additional request by the UE device for performance of an additional distributed computing service; and
fulfilling, by the latency service system, the additional request for the performance of the additional distributed computing service by:
   determining, based on the real-time latency performance data, an additional characteristic of the geographic zone, the additional characteristic associated with latency performance that the distributed computing network is capable of providing in the geographic zone at the second time; and
   orchestrating, based on the particular latency performance level and the additional characteristic of the geographic zone, the performance of the additional distributed computing service for the UE device by the distributed computing network;
wherein:
   the orchestrating of the performance of the distributed computing service includes assigning a first compute node of the distributed computing network to perform the distributed computing service, and
   the orchestrating of the performance of the additional distributed computing service includes assigning a second compute node of the distributed computing network to perform the additional distributed computing service, the second compute node providing resource efficiency superior to resource efficiency provided by the first compute node.

9. The method of claim 1, further comprising:
determining, by the latency service system in response to the request for performance of the distributed computing service, a latency tolerance associated with the distributed computing service that has been requested;
wherein the orchestrating of the performance of the distributed computing service is further based on the latency tolerance by assigning, for the performance of the distributed computing service and from the distributed computing network, a compute node that satisfies the latency tolerance while also targeting a maximum resource efficiency.

10. A system comprising:
a memory storing instructions; and
a processor communicatively coupled to the memory and configured to execute the instructions to:
   determine, in response to a request by a user equipment (UE) device for performance of a distributed computing service, a particular latency performance level to which the UE device is subscribed, the particular latency performance level selected from a plurality of latency performance levels including:
      a first latency performance level associated with a guarantee to provide at least a particular latency performance,
      a second latency performance level associated with a best effort to provide at least the particular latency performance but not associated with the guarantee, and
      a third latency performance level associated with neither the guarantee nor the best effort to provide at least the particular latency performance, the third latency performance level providing a latency performance that varies with a real-time condition of a distributed computing network that is to perform the distributed computing service for the UE device; and
   fulfill the request for the performance of the distributed computing service by:
      obtaining real-time latency performance data for the distributed computing network;
      determining, based on the real-time latency performance data, a characteristic of a geographic zone in which the UE device is located, the characteristic associated with latency performance that the distributed computing network is capable of providing in the geographic zone; and
      orchestrating, based on the particular latency performance level and the characteristic of the geographic zone, the performance of the distributed computing service for the UE device by the distributed computing network.

11. The system of claim 10, wherein the processor is further configured to execute the instructions to:
   add, to a latency service database, data representative of the characteristic of the geographic zone and a time at which the characteristic of the geographic zone was determined; and
   provide, to a service support system, data representative of the characteristic of the geographic zone and the time at which the characteristic of the geographic zone was determined.

12. The system of claim 10, wherein:
   the processor is further configured to execute the instructions to define a boundary for the geographic zone, the boundary defined based on a geolocation of a network communication node that is located within the geographic zone and that enables communication between the UE device and the distributed computing network while the UE device is located in the geographic zone; and
   the characteristic of the geographic zone is an upper or lower bound of latency performance that the distributed computing network is capable of providing to UE devices located within the boundary defined for the geographic zone at a particular time.

13. The system of claim 12, wherein the processor is further configured to execute the instructions to:
   generate map data representative of a map depicting a real-time graphical representation of the boundary for the geographic zone and the characteristic of the geographic zone; and
   provide the map data to a service support system configured to present, in real time and based on the map data, the map to an operator associated with operating the distributed computing network.

14. The system of claim 12, wherein the processor is further configured to execute the instructions to:
   generate map data representative of a map depicting a graphical representation of the boundary for the geographic zone and the characteristic of the geographic zone; and
   provide the map data to the UE device to present, based on the map data, the map to a user of the UE device.

15. The system of claim 10, wherein:
   the processor is further configured to execute the instructions to:
      determine, in response to an additional request by an additional UE device for performance of an additional distributed computing service, an additional latency performance level, of the plurality of latency performance levels, to which the UE device is subscribed, wherein the additional latency performance level is lower than the particular latency performance level and wherein the additional UE device is located in the geographic zone, and
      fulfill the additional request for the performance of the additional distributed computing service by orchestrating, based on the additional latency performance level and the characteristic of the geographic zone, the performance of the additional distributed computing service for the additional UE device by the distributed computing network;
   the orchestrating of the performance of the distributed computing service includes assigning a first compute node of the distributed computing network to perform the distributed computing service; and
   the orchestrating of the performance of the additional distributed computing service includes assigning a second compute node of the distributed computing network to perform the additional distributed computing service, the second compute node providing latency performance inferior to latency performance provided by the first compute node.

16. The system of claim 10, wherein:
   the processor is further configured to execute the instructions to:
      determine, in response to an additional request by an additional UE device for performance of an additional distributed computing service, an additional latency performance level, of the plurality of latency performance levels, to which the UE device is subscribed, wherein the additional latency performance level is equal to the particular latency performance level and wherein the additional UE device is located in an additional geographic zone separate from the geographic zone, and
      fulfill the additional request for the performance of the additional distributed computing service by:
         determining, based on the real-time latency performance data, a characteristic of the additional geographic zone and associated with latency performance that the distributed computing network is capable of providing in the additional geographic zone, and
         orchestrating, based on the additional latency performance level and the characteristic of the additional geographic zone, the performance of the additional distributed computing service for the additional UE device by the distributed computing network;
   the orchestrating of the performance of the distributed computing service includes assigning a first compute node of the distributed computing network to perform the distributed computing service; and
   the orchestrating of the performance of the additional distributed computing service includes assigning a second compute node of the distributed computing network to perform the additional distributed computing service, the second compute node providing latency performance inferior to latency performance provided by the first compute node.

17. The system of claim 10, wherein:
   the processor is further configured to execute the instructions to:
      receive, at a first time when the UE device is located in the geographic zone, the request from the UE device for performance of the distributed computing service,
      receive, at a second time different from the first time and when the UE device is also located in the geographic zone, an additional request by the UE device for performance of an additional distributed computing service, and
      fulfill the additional request for the performance of the additional distributed computing service by:
         determining, based on the real-time latency performance data, an additional characteristic of the geographic zone, the additional characteristic associated with latency performance that the distributed computing network is capable of providing in the geographic zone at the second time, and
         orchestrating, based on the particular latency performance level and the additional characteristic of the geographic zone, the performance of the additional distributed computing service for the UE device by the distributed computing network;

the orchestrating of the performance of the distributed computing service includes assigning a first compute node of the distributed computing network to perform the distributed computing service at the first time; and the orchestrating of the performance of the additional distributed computing service includes assigning a second compute node of the distributed computing network to perform the additional distributed computing service at the second time, the second compute node providing resource efficiency superior to resource efficiency provided by the first compute node.

18. The system of claim 10, wherein:

the processor is further configured to execute the instructions to determine, in response to the request for performance of the distributed computing service, a latency tolerance associated with the distributed computing service that has been requested; and the orchestrating of the performance of the distributed computing service is further based on the latency tolerance by assigning, for the performance of the distributed computing service and from the distributed computing network, a compute node that satisfies the latency tolerance while also targeting a maximum resource efficiency.

19. A non-transitory computer-readable medium storing instructions that, when executed, direct a processor of a computing device to:

determine, in response to a request by a user equipment (UE) device for performance of a distributed computing service, a particular latency performance level to which the UE device is subscribed, the particular latency performance level selected from a plurality of latency performance levels including:

a first latency performance level associated with a guarantee to provide at least a particular latency performance, a second latency performance level associated with a best effort to provide at least the particular latency performance but not associated with the guarantee, and a third latency performance level associated with neither the guarantee nor the best effort to provide at least the particular latency performance, the third latency performance level providing a latency performance that varies with a real-time condition of a distributed computing network that is to perform the distributed computing service for the UE device; and fulfill the request for the performance of the distributed computing service by:

obtaining real-time latency performance data for the distributed computing network;

determining, based on the real-time latency performance data, a characteristic of a geographic zone in which the UE device is located, the characteristic associated with latency performance that the distributed computing network is capable of providing in the geographic zone; and orchestrating, based on the particular latency performance level and the characteristic of the geographic zone, the performance of the distributed computing service for the UE device by the distributed computing network.

20. The non-transitory computer-readable medium of claim 19, wherein:

the instructions, when executed, further direct the processor to determine, in response to the request for performance of the distributed computing service, a latency tolerance associated with the distributed computing service that has been requested; and the orchestrating of the performance of the distributed computing service is further based on the latency tolerance by assigning, for the performance of the distributed computing service and from the distributed computing network, a compute node that satisfies the latency tolerance while also targeting a maximum resource efficiency.

* * * * *